US008668535B1

(12) United States Patent
Scroggs

(10) Patent No.: US 8,668,535 B1
(45) Date of Patent: Mar. 11, 2014

(54) AMPHIBIOUS VEHICLE HAVING A SINGLE DRIVE SYSTEM FOR LAND AND WATER OPERATIONS

(76) Inventor: Douglas Scroggs, Princeton, IL (US)

( * ) Notice: Subject to any disclaimer, the term of this patent is extended or adjusted under 35 U.S.C. 154(b) by 0 days.

(21) Appl. No.: 13/617,563

(22) Filed: Sep. 14, 2012

(51) Int. Cl.
*B63H 19/08* (2006.01)

(52) U.S. Cl.
USPC .................................... 440/12.69; 440/12.66

(58) Field of Classification Search
USPC ................ 440/12.5, 92, 12.63–12.69, 12.66; 446/164
See application file for complete search history.

(56) References Cited

U.S. PATENT DOCUMENTS 4,433,634 A * 2/1984 Coast ........................ 440/12.64
4,473,358 A * 9/1984 Viosca, Jr. ...................... 440/92
4,547,166 A * 10/1985 Goldfarb et al. .............. 446/164
4,652,247 A * 3/1987 Goldfarb et al. .............. 446/164
5,487,692 A * 1/1996 Mowrer et al. ............... 446/465
7,429,203 B1 * 9/2008 Averett .......................... 440/91
7,445,530 B2 * 11/2008 Munshaur et al. ......... 440/12.66
7,850,252 B2 * 12/2010 Mills et al. .................. 301/40.1
7,942,710 B2 * 5/2011 Gaither ............................ 440/5
8,277,267 B1 * 10/2012 Chippas .................... 440/12.63
2011/0275255 A1 * 11/2011 Au et al. ...................... 440/12.5

* cited by examiner

*Primary Examiner* — Lars A Olson
*Assistant Examiner* — Jovon Hayes
(74) *Attorney, Agent, or Firm* — Carla Gannon Law

(57) ABSTRACT

An amphibious vehicle, mostly watercraft in appearance, has a single drive system that accelerates, propels, steers, reverses, and brakes the vehicle on land or in the water. This control is effectuated by one or both twin control levels positioned to the left and right of the vehicle operator. Rear mounted propulsions units include a paddlewheel and tire combination, which operate independently and are rotatable in either direction.

11 Claims, 4 Drawing Sheets

AMPHIBIOUS VEHICLE HAVING A SINGLE DRIVE SYSTEM FOR LAND AND WATER OPERATIONS

BACKGROUND OF THE INVENTION

The present invention relates to vehicles, and more specifically, to an amphibious vehicle having a single drive system that runs the vehicle whether it is on land, or in water.

There are many circumstances where it is necessary or desirable to have an amphibious vehicle. Examples of situations where amphibious vehicles are used include recreation, flood rescue, thin ice rescue, hunting, fishing, and traveling through areas having both water and solid surfaces.

However, operating in water and on solid surfaces presents vastly different engineering challenges, as evidenced by, for example, cars and boats looking and functioning very differently. The typical way to overcome these engineering challenges in an amphibious vehicle is to provide dual systems for steering, braking, reversing, and so forth—one for water use and one land use. Unfortunately, however, this duplicative engineering renders the resulting vehicle complicated, expensive, and/or more prone to breakage.

While military amphibious vehicles are very durable, they are too complicated to operate and expensive to operate for general civilian use.

As can be seen, there is a need for an amphibious vehicle which is structurally relatively simple, easy to operate, and less expensive to produce than other amphibious vehicles, so as to reasonably lend itself to purchase and use by the population at large. It is desirable that this vehicle has a single drive system, versus duplicative systems for use in water versus solid surfaces.

SUMMARY OF THE INVENTION

Embodiments of the present invention include an amphibious vehicle having a single drive system that accelerates, propels, steers, reverses and brakes the vehicle on land and water. A pair of spaced propulsion assemblies are each conjoined rubberized tire and paddlewheel hybrids.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers apply among the various FIGS:

10 is an operator;
12 is a free wheel;
14 is a shell;
16 is a hydro-propulsion unit;
18 is an engine;
19 is a hydrostatic transmission;
20 is a solid driving surface;
22 is a seat;
24 is a control lever;
26 is a drive wheel;
28 is a body of water;
30 is a four-wheel embodiment; and
32 is a three-wheel embodiment.

Broadly, an embodiment of the present invention provides an amphibious vehicle, mostly watercraft in appearance, which is as capable on land as it is in the water. The main components of the vehicle include a floatation shell, engine, controls, hydraulic drive with hydro-propulsion and drive wheels.

Referring to the FIGS, shell 14 provides floatation as well as the framework upon which the other components are affixed. It is preferably boat-like and constructed of lightweight yet strong and water resistant materials such as aluminum, plastic or fiberglass, and is formed in a traditional boat shape having a concave bottom-side and substantially hollow center which is accessed by passengers through the top. Alternatively, it is within the scope of this invention to use inflatable boats, pontoons, canoes, kayaks or the like as shell 14.

The vehicle is operated using a pair of control levers 24, preferably mounted on either side of seat 22. These levers are multi-directional and multi-functional, with some functions requiring one lever, and some functions requiring both.

Engine 18 is preferably a conventional gasoline engine, and powers a hydraulic drive system. The engine's speed is controlled by a separate, preset, throttle control lever, while acceleration rate and vehicle speed are determined by the interaction of both controllers 24.

Figure 9:
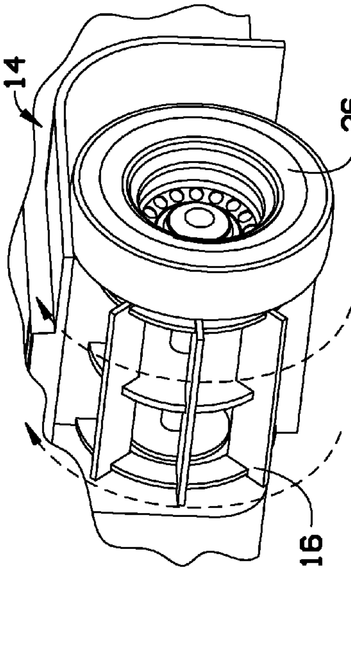
FIG. 9 is a detail rear perspective view of an embodiment illustrating rotational motion of propulsion units.
Figure 10:
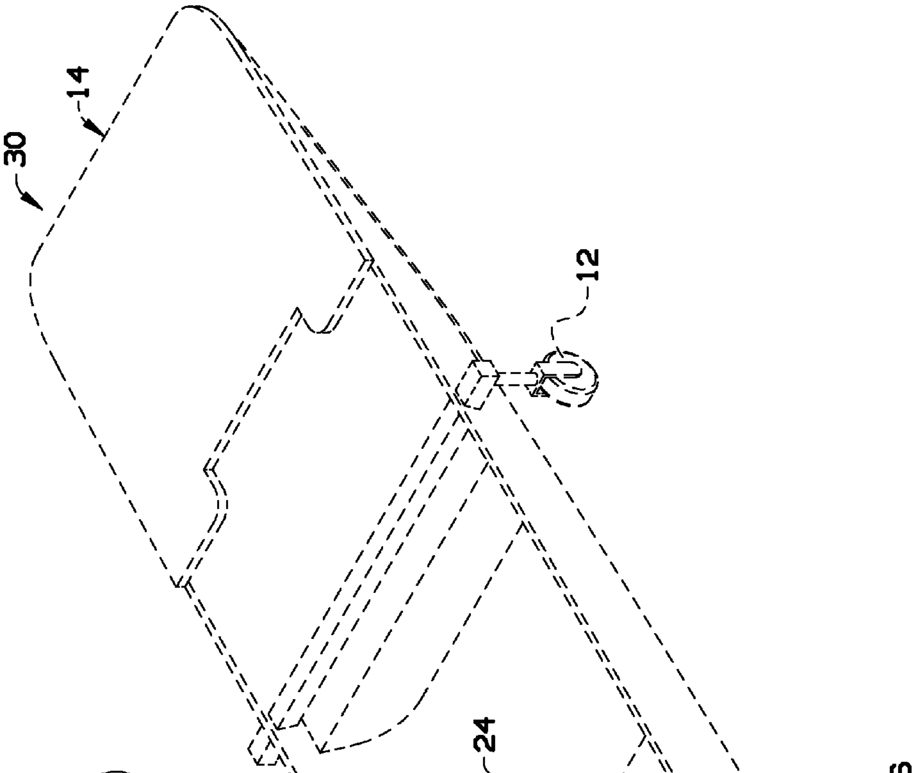
FIG. 10 is a rear perspective view of an embodiment demonstrating component relationships.
Figure 10:
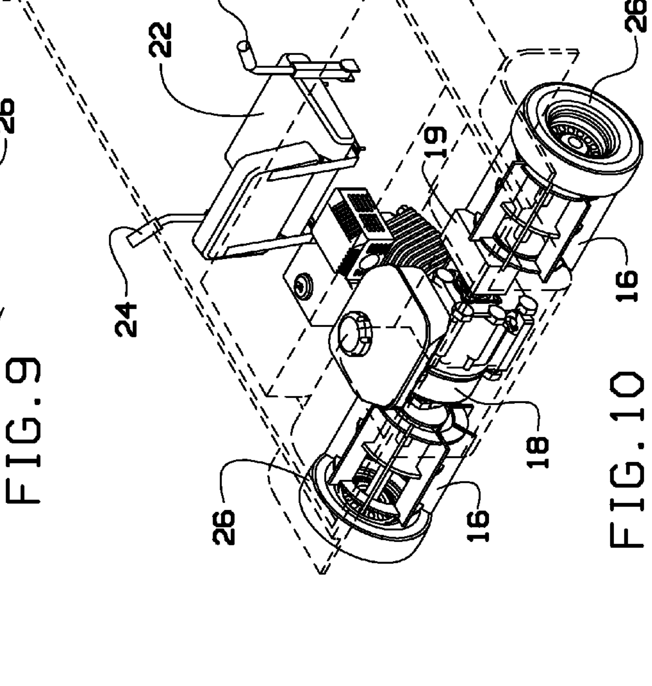

Referring to FIGS. 9 and 10, left and right propulsion assemblies are generally mounted rearward, and include the combination of hydro-propulsion unit 16 and drive wheel 26. Hydro-propulsion unit 16 is preferably a paddlewheel assembly. It is desirable that the propulsions assemblies are substantially permanently connected and conjoined, such that they rotate in unison, are free to rotate in either direction (clockwise and counterclockwise) to effectuate both forward and reverse driving, and are mounted outboard. It is preferred that drive wheel 26 is located towards the back of the vehicle includes a rubberized tire suitable for solid surface driving, and is minimally larger in diameter than paddlewheel of hydro-propulsion unit 16, such that paddlewheel assembly isn't in contact with solid driving surface 20 in use. The left and right propulsion assemblies are each controlled independently by the operator.

Left and right hydrostatic drive units 19 connect engine 16 with the left and right propulsion assemblies. Each hydrostatic drive unit 19 (left and right) is in communication with, and operatively controlled by, left and right control levers 24, which control the direction and speed of each of the propulsion assemblies. It should be noted that different drive systems that provide variable speed in both forward and reverse may be suitable for this invention, but that hydrostatic transmissions are preferred. Left and right drive assemblies can be used to drive either propulsion unit (left or right) in the same direction or in opposite directions. Steering, braking and propulsion are all accomplished with control levers 24. When the propulsion units are driven in opposite directions the vehicle makes a zero-radius turn. This is a so called ‘zero-turn’ amphibious vehicle.

Figure 1:
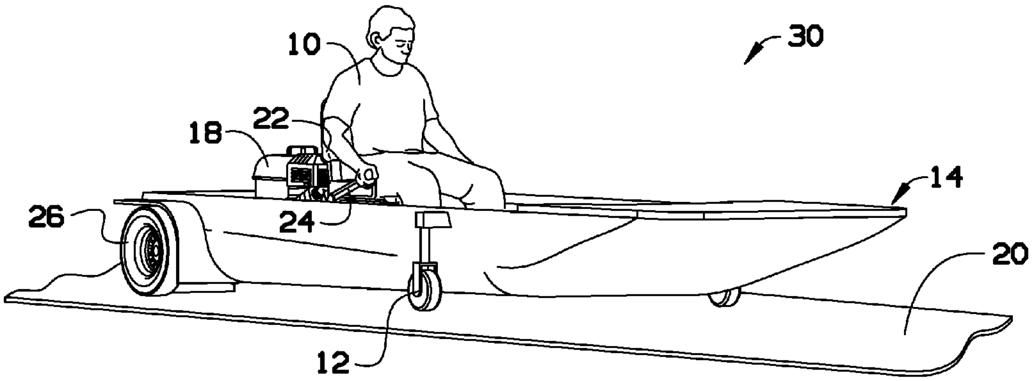
FIG. 1 is a forward perspective view of an embodiment of the invention shown in use on a solid surface.
Figure 2:
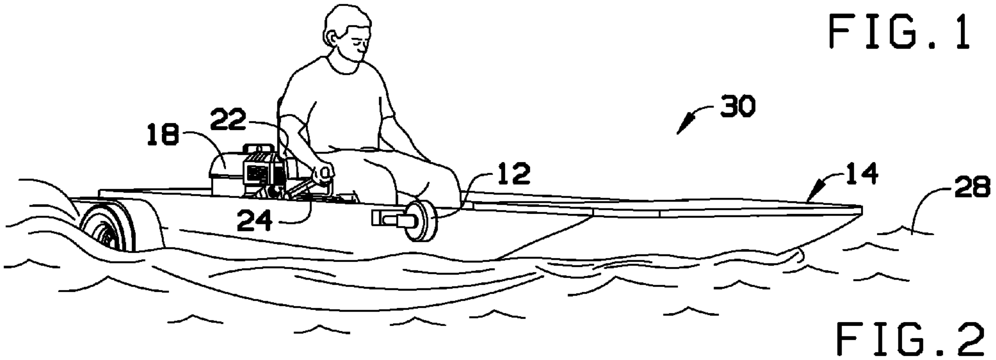
FIG. 2 is a forward perspective view of an embodiment of the invention shown in use on water.
Figure 3:
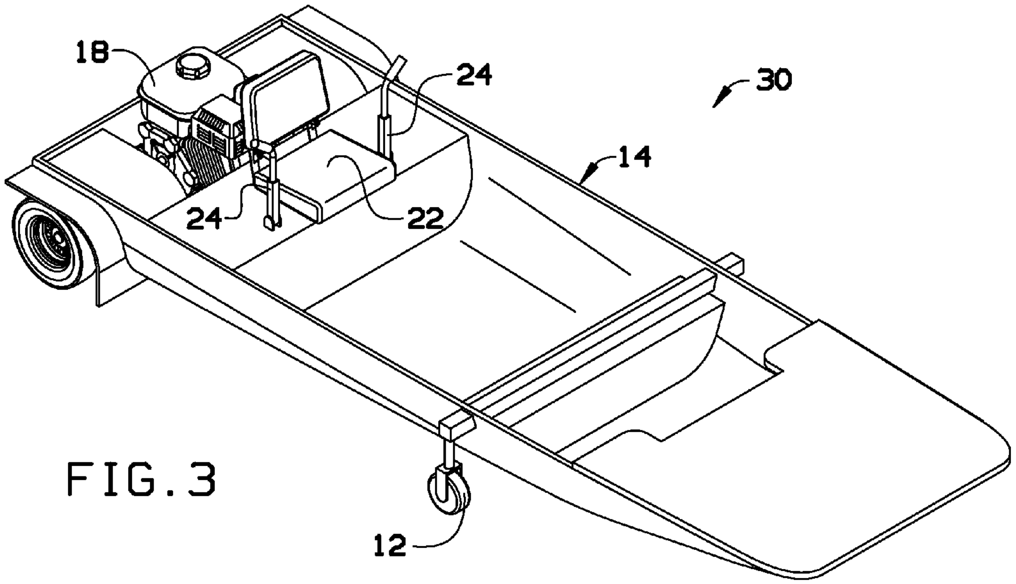
FIG. 3 is a side perspective view of an embodiment.
Figure 6:
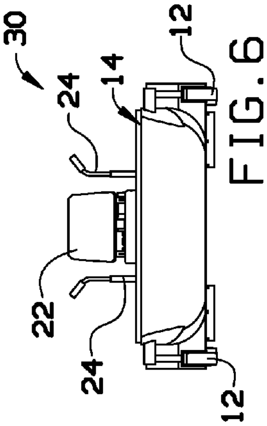
FIG. 6 is a front view of an embodiment.
Figure 7:
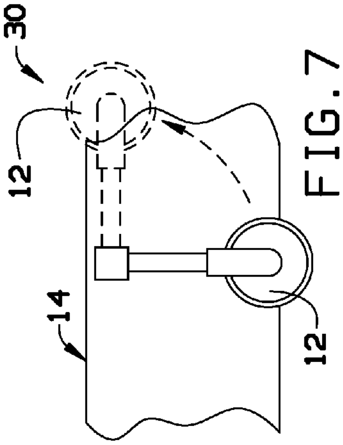
FIG. 7 is a detail side view of an embodiment illustrating item 12 free wheel in land and water configuration.
Figure 4:
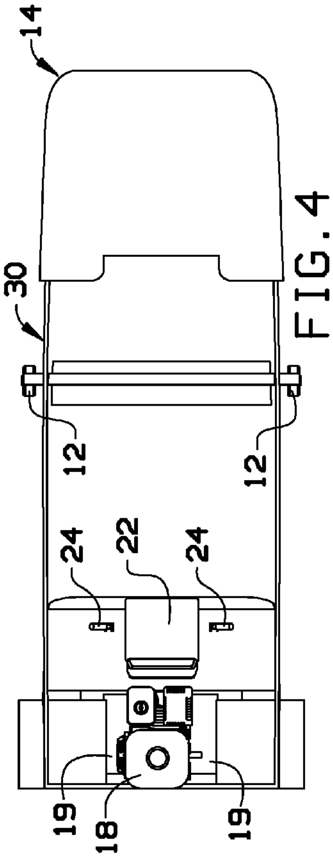
FIG. 4 is a top view of an embodiment.
Figure 5:
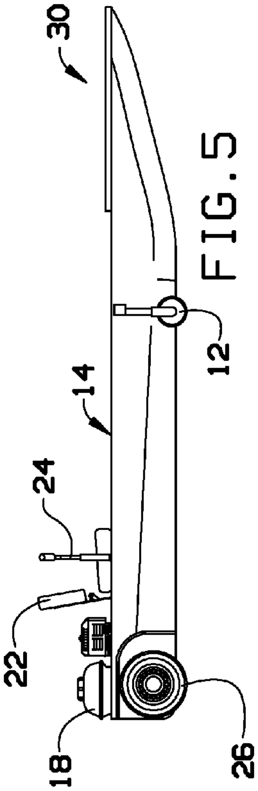
FIG. 5 is a side view of an embodiment.
Figure 8:
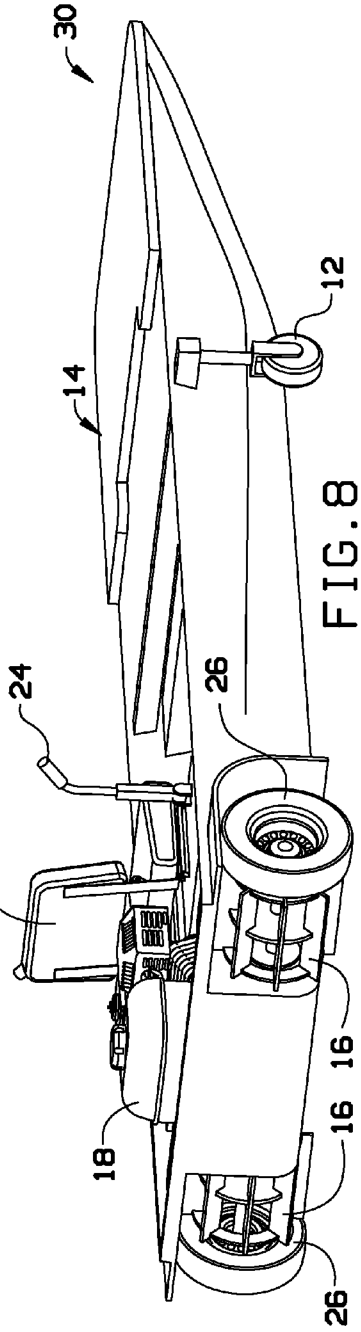
FIG. 8 is a rear perspective view of an embodiment.
Figure 11:
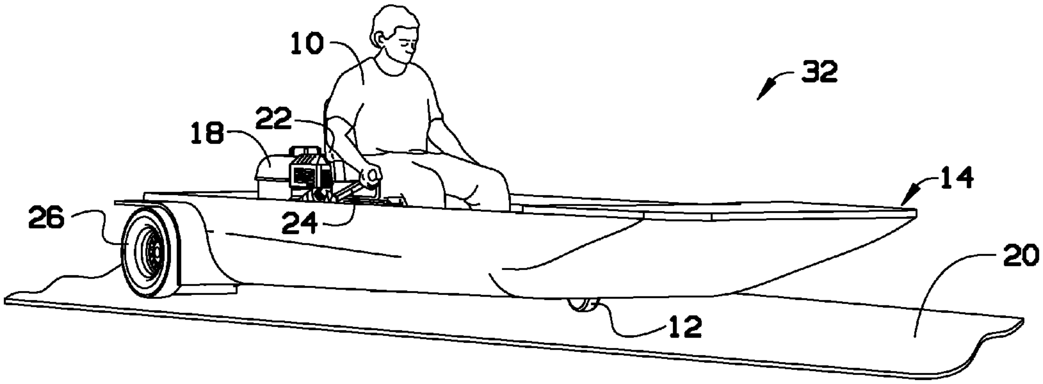
FIG. 11 is a forward perspective view of a three-wheeled embodiment of the invention shown in use.
Figure 12:
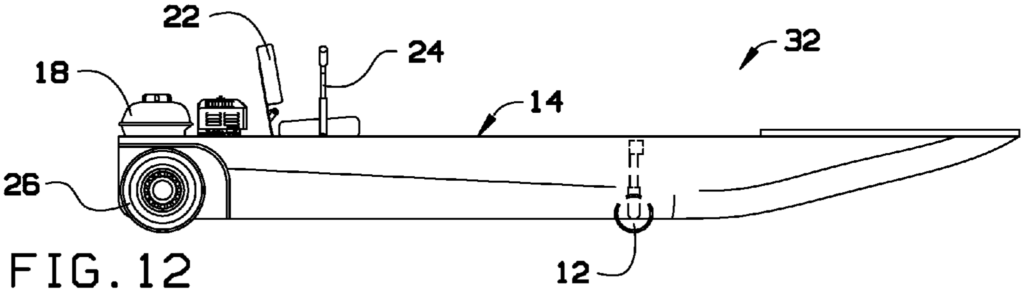
FIG. 12 is a side view of a three-wheeled embodiment of the invention.
Figure 13:
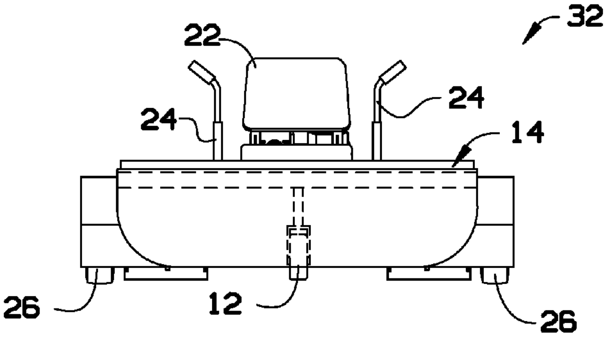
FIG. 13 is a front view of a three-wheeled embodiment of the invention.

Free wheel 12 is preferably located towards the front of the vehicle, is for land use and is preferably a freely rotating wheel, such as a caster wheel. It is desirable that free wheel 12 can be retracted while in the water, as depicted in FIG. 7. The invention includes an embodiment having a single free wheel 12, depicted in FIGS. 11-13, as well as an embodiment having dual free wheels 12, depicted in FIGS. 4 and 10. Factors such as weight, weight distribution and shape of the vehicle may be determinative of employing a single or dual wheel.

To operate this vehicle on land or water the operator is seated inboard with one control lever 24 at each hand. Forward, neutral and reverse action are effectuated by varying the acceleration using control levers 24, with each left and right controller 24 independently controlling the corresponding left and right propulsion unit. Maneuvering the vehicle is accomplished by changing the speed or direction of the propulsion units using the controllers. When both controllers are pushed forward simultaneously with the same force, the vehicle moves forward. When both controllers are pulled back simultaneously with the same force, the vehicle moves backward. Braking is effectuated in the forward moving vehicle by moving the controllers back. Braking is effectuated in the reverse moving vehicle by moving the controllers forward. A gentle turn is effectuated by pushing one controller more than the other. A zero-radius turn or zero turn is effectuated by pushing one controller forward and pulling the other controller back.

It is possible to fabricate, manufacture and assemble the vehicle for delivery to a user, or sell as a kit for assembly by an end user.

As used herein, “single drive system” and the like shall refer to the mechanical components which collectively function to drive the vehicle, including acceleration, propulsion, steering and braking. It is important to note that the present invention uses a single drive system for land and water transportation. In other words, one steering system is employed for steering on land or water, one set of controllers is employed for directing the vehicle on land or water, and so forth. No components of the drive system are duplicative for purposes of having a structure for use in land transportation and a different structure for use in water transportation. The hydro-propulsion unit 16 and drive wheel 26, collectively called (but not numbered) the “propulsion assembly” is not considered to be part of the “hydraulic drive system” or “drive system”, which includes the controller, engine and hydrostatic transmission.

It should be understood, of course, that the foregoing relates to exemplary embodiments of the invention and that modifications may be made without departing from the spirit and scope of the invention as set forth in the following claims. Examples of modifications within the scope of this invention include varying the location of the hydro-propulsion unit 16 and/or free wheel 12 locations. The propulsion units 16 and drive wheel 26, are opposite one another, but can be located fore, aft or in the center, with free wheel 12 located accordingly, aft, fore or both. They can be singles or in pairs. Vehicle control will be similar in all wheel locations but the degree of difficulty exiting the water will change with variations in drive and free wheel configurations. By way of example, the hydro-propulsion units may not push the free wheels up a steep incline, for example a boat ramp, if located in the center, but the vehicle can back up the incline if wheels are located in the conventional position. The twin control levers 24 can be replaced with single or dual joysticks, with the control remaining the same. It should also be understood that ranges of values set forth inherently include those values, as well as all increments between.

What is claimed is:

1. An amphibious vehicle comprising:

a. A single drive system for effectuating both water and land travel;

b. A left control lever in operative communication with said single drive system;

c. A right control lever in operative communication with said single drive system;

d. A single left propulsion assembly in operative communication with said left control lever; and e. A single right propulsion assembly in operative communication with said right control lever, wherein said left and right propulsion assemblies are configured to engage with water and land and thrust said vehicle, with said left and right propulsion assemblies each including a hydro-propulsion unit having a proximal paddlewheel, and a land propulsion unit having a distal rubberized tire, said left and right propulsion assemblies connected one to another.

2. The amphibious vehicle of claim 1 wherein said single drive system includes left and right hydrostatic drive units for rotating said corresponding left propulsion assembly and said corresponding right propulsion assembly independently in a first direction.

3. The amphibious vehicle of claim 2 wherein said left and right hydrostatic drive units are for rotating said corresponding left propulsion assembly and said corresponding right propulsion assembly independently in a second direction.

4. An amphibious vehicle comprising:

a. A shell having a bow and a stern;

b. A first free wheel connected to the bottom-side of said shell’s bow;

c. An engine connected to said shell’s stern;

d. A single drive system connected to said engine, said single drive system for effectuating forward and reverse acceleration of said amphibious vehicle across both land and water;

e. A left control lever operatively connected to said single drive system;

f. A right control lever operatively connected to said single drive system;

g. A single left propulsion assembly operatively connected to said left control lever, said left propulsion assembly including a left paddle wheel connected to a left rubberized tire; and h. A single right propulsion assembly operatively connected to said right control lever, said right propulsion assembly including a right paddle wheel connected to a right rubberized tire, wherein said engine, said single drive system, said single left propulsion assembly, and said single right propulsion assembly are linearly aligned along said shell’s stern.

5. The amphibious vehicle of claim 4 further including a seat mounted within said shell.

6. The amphibious vehicle of claim 5 wherein said left and right controls are positioned to the left and right of said seat.

7. The amphibious vehicle of claim 4 further comprising a second free wheel connected to the bottom-side of said shell.

8. A method of maneuvering an amphibious vehicle using a left and/or right control lever, said method including the steps of:

a. Pushing said left lever and said right lever forward simultaneously to effectuate forward movement of said vehicle by rotating a respective single left propulsion assembly, and a single right propulsion assembly, each propulsion assembly having a single proximal paddlewheel adjoined to a single distal rubberized tire;

b. Pulling said left lever and said right lever backwards simultaneously to effectuate reverse movement of said vehicle;

c. Pulling said left lever and said right lever backward simultaneously while vehicle is moving forward to effectuate braking of said vehicle; and d. Pushing said left lever and said right lever forward simultaneously while vehicle is moving in reverse to effectuate braking of said vehicle.

9. The method of claim 8 further including the step of pushing said left lever forward to a greater magnitude than said right lever is pushed forward, to effectuate a right turn.

10. The method of claim 8 further including the step of pushing said right lever forward to a greater magnitude than said left lever is pushed forward, to effectuate a left turn.

11. The method of claim 8 further including the step of pushing one controller forward and pulling the other controller back, to effectuate a zero-radius turn.

* * * * *